(12) United States Patent
Lee et al.

(10) Patent No.: US 10,423,910 B2
(45) Date of Patent: Sep. 24, 2019

(54) RETAIL INVENTORY SUPPLY CHAIN MANAGEMENT

(71) Applicant: Walmart Apollo, LLC, Bentonville, AR (US)

(72) Inventors: Ryan Lee, Bentonville, AR (US); Joseph Blackner, Bella Vista, AR (US); Santos Cerda, Jr., Centerton, AR (US); Todd D. Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/381,371

(22) Filed: Apr. 11, 2019

(65) Prior Publication Data

US 2019/0236517 A1   Aug. 1, 2019

Related U.S. Application Data

(63) Continuation of application No. 15/939,783, filed on Mar. 29, 2018, now Pat. No. 10,304,017.
(Continued)

(51) Int. Cl.
*G06F 7/00* (2006.01)
*G06Q 10/06* (2012.01)
(Continued)

(52) U.S. Cl.
CPC ..... *G06Q 10/063114* (2013.01); *G06F 3/167* (2013.01); *G06K 7/10297* (2013.01);
(Continued)

(58) Field of Classification Search
None
See application file for complete search history.

(56) References Cited

U.S. PATENT DOCUMENTS

| 4,974,391 A | 12/1990 | Blum |
| 5,532,692 A | 7/1996 | Tatsuya |

(Continued)

FOREIGN PATENT DOCUMENTS

| WO | 2000063805 | 10/2000 |
| WO | 2005067438 | 7/2005 |
| WO | 2011054053 | 5/2011 |

OTHER PUBLICATIONS

Arox Smart Technologies B.V.; "Smart glasses order picking innovation in warehouse and logistics"; https://www.youtube.com/watch?v=sGBNpvqT-kc; Published on Apr. 21, 2016; pp. 1-7.
(Continued)

*Primary Examiner* — Yolanda R Cumbess
(74) *Attorney, Agent, or Firm* — Fitch, Even, Tabin & Flannery LLP

(57) ABSTRACT

In some embodiments, apparatuses and methods are provided herein useful for monitoring and updating a supply chain record for one or more products. More specifically, a wearable smart device can be utilized by users to access a supply chain for a particular product, which can include shipping information, delivery vehicle information, package information, package condition, source information, destination information, storage information, and so forth. The wearable smart device can include an output device to present the supply chain to the user. The wearable smart device can also include a user input to add, update, or revise various pieces of information in the supply chain.

20 Claims, 9 Drawing Sheets

Related U.S. Application Data

(60) Provisional application No. 62/478,093, filed on Mar. 29, 2017, provisional application No. 62/478,098, filed on Mar. 29, 2017.

(51) Int. Cl.
*G06Q 10/08* (2012.01)
*G10L 15/22* (2006.01)
*G06K 7/10* (2006.01)
*G06F 3/16* (2006.01)
*H04N 7/18* (2006.01)
*G06F 3/01* (2006.01)

(52) U.S. Cl.
CPC ....... *G06Q 10/087* (2013.01); *G06Q 10/0875* (2013.01); *G10L 15/22* (2013.01); *G06F 3/013* (2013.01); *G10L 2015/223* (2013.01); *H04N 7/183* (2013.01)

(56) References Cited

U.S. PATENT DOCUMENTS

| | | | |
|---|---|---|---|
| 6,744,436 B1 | 6/2004 | Chirieleison | |
| 7,201,316 B2 | 4/2007 | Anderson | |
| 7,756,632 B2 | 7/2010 | Wise | |
| 8,425,173 B2 | 4/2013 | Lert | |
| 8,558,758 B2 | 10/2013 | Sato | |
| 8,626,611 B2 * | 1/2014 | Bravo | G01C 21/20 235/375 |
| 8,756,165 B1 | 6/2014 | Haake | |
| 9,024,842 B1 | 5/2015 | Prada Gomez | |
| 9,151,953 B2 | 10/2015 | Qaddoura | |
| 9,171,277 B2 | 10/2015 | Rutt | |
| 9,171,278 B1 | 10/2015 | Kong | |
| 9,342,610 B2 | 5/2016 | Liu | |
| 9,477,888 B1 | 10/2016 | Lewis | |
| 1,539,810 A1 | 1/2017 | High | |
| 1,539,909 A1 | 1/2017 | High | |
| 1,540,005 A1 | 1/2017 | High | |
| 9,743,239 B1 | 8/2017 | Mishra | |
| 1,588,242 A1 | 1/2018 | Lee | |
| 1,588,252 A1 | 1/2018 | Lee | |
| 1,593,975 A1 | 3/2018 | Lee | |
| 1,030,401 A1 | 5/2019 | Lee | |
| 2002/0050526 A1 | 5/2002 | Swartz | |
| 2002/0062193 A1 | 5/2002 | Lin | |
| 2002/0178074 A1 | 11/2002 | Bloom | |
| 2003/0149644 A1 | 8/2003 | Stingel | |
| 2003/0233165 A1 | 12/2003 | Hein | |
| 2004/0015393 A1 | 1/2004 | Fong | |
| 2004/0153379 A1 | 8/2004 | Joyce | |
| 2004/0182925 A1 | 9/2004 | Anderson | |
| 2004/0217166 A1 | 11/2004 | Myers | |
| 2004/0243430 A1 | 12/2004 | Horstemeyer | |
| 2005/0175441 A1 | 8/2005 | Liberman | |
| 2006/0159307 A1 | 7/2006 | Anderson | |
| 2007/0013519 A1 | 1/2007 | Chung | |
| 2008/0131255 A1 | 6/2008 | Hessler | |
| 2008/0312991 A1 | 12/2008 | Bharadwaj | |
| 2009/0307096 A1 | 12/2009 | Antonellis | |
| 2009/0313072 A1 | 12/2009 | Balok | |
| 2010/0296908 A1 | 11/2010 | Ko | |
| 2012/0150342 A1 | 6/2012 | Song | |
| 2012/0212400 A1 | 8/2012 | Border | |
| 2012/0212406 A1 | 8/2012 | Osterhout | |
| 2012/0212414 A1 | 8/2012 | Osterhout | |
| 2013/0050258 A1 | 2/2013 | Liu | |
| 2013/0090757 A1 | 4/2013 | Phan | |
| 2013/0141313 A1 | 6/2013 | Zhou | |
| 2013/0233922 A1 | 9/2013 | Schoening | |
| 2013/0278631 A1 | 10/2013 | Border | |
| 2013/0290106 A1 | 10/2013 | Bradley | |
| 2013/0346168 A1 | 12/2013 | Zhou | |
| 2014/0019311 A1 | 1/2014 | Tanaka | |
| 2014/0032360 A1 | 1/2014 | Nicholson | |
| 2014/0102860 A1 | 4/2014 | Greyshock | |
| 2014/0188270 A1 | 7/2014 | Stelzer | |
| 2014/0207615 A1 | 7/2014 | Li | |
| 2014/0214628 A1 | 7/2014 | Argue | |
| 2014/0253868 A1 | 9/2014 | Jannard | |
| 2014/0257553 A1 | 9/2014 | Shakes | |
| 2014/0267263 A1 | 9/2014 | Beckwith | |
| 2014/0267399 A1 | 9/2014 | Zamer | |
| 2014/0278627 A1 | 9/2014 | Grabovski | |
| 2014/0279294 A1 | 9/2014 | Field-Darragh | |
| 2014/0279660 A1 | 9/2014 | Santavicca | |
| 2015/0058245 A1 | 2/2015 | Matthews | |
| 2015/0088452 A1 | 3/2015 | Troxler | |
| 2015/0120514 A1 | 4/2015 | Deshpande | |
| 2015/0192774 A1 | 7/2015 | Watanabe | |
| 2015/0204684 A1 | 7/2015 | Rostamian | |
| 2015/0210199 A1 | 7/2015 | Payne | |
| 2015/0298808 A1 | 10/2015 | Huber | |
| 2015/0356610 A1 | 12/2015 | Ponoth | |
| 2016/0092805 A1 | 3/2016 | Geisler | |
| 2016/0129592 A1 | 5/2016 | Saboo | |
| 2016/0224930 A1 | 8/2016 | Kadaba | |
| 2016/0224931 A1 | 8/2016 | Shah | |
| 2016/0314429 A1 | 10/2016 | Gillen | |
| 2016/0371647 A1 | 12/2016 | Loverich | |
| 2017/0017301 A1 | 1/2017 | Doornenbal | |
| 2017/0041452 A1 | 2/2017 | Amann | |
| 2018/0109828 A1 * | 4/2018 | Knox | H04N 21/42201 |
| 2018/0130110 A1 | 5/2018 | McCarthy | |
| 2018/0285804 A1 * | 10/2018 | Lee | G06F 3/167 |

OTHER PUBLICATIONS

Böhme, T.; "Augmented Reality and Wearables: What the Experts Say"; http://news.sap.com/augmented-reality-wearables-thats-experts-say/; Jan. 22, 2015; 6 pages.

Burnha, Ted; "Smart Glasses for Warehouses: SmartPick"; http://postscapes.com/smartglassesforwarehousessmartpick; Jul. 4, 2016; pp. 1-3.

Connect Smart Glasses and SAP with the Simplifier; https://www.youtube.com/watch?v+ZWsBHISOqjA; 5 pages.

DHL; Vision Picking at Dhl—Augmented Reality in Logistics; https://www.youtube.com/watch?v=I8vYrAUb0BQ; Published on Jan. 26, 2015; 8 Pages.

Frederick, E.; "USPS looks into AR glasses to stay relevant and efficient"; published Apr. 10, 2015; http://www.wearables.com/usps-ar-glasses-smartglasses; 4 pages.

Glockner, Holger; "Augmented Reality in Logistics: Changing the way we see logistics —a DHL perspective"; Published in 2014; 28 pages.

Heutger, M, et al.; "Logistics Trend Radar"; published 2016 by DHL Customer Solutions & Innovation; 55 pages.

iTiZZiMO; "Connect Smart Glasses and SAP with the Simplifier"; https://www.youtube.com/watch?v=ZWsBHISOqjA; Published on Jun. 5, 2013; 13 pages.

Knapp AG; Knapp AG—KiSoft Vision; https://www.youtube.com/watch?v=BWY8uFltelM; Published on Dec. 7, 2011; pp. 1-7.

KPIT; "Augment Reality, Hands Free Warehouse Picking Solution with Wearable Glass"; https://www.google.com/url?q=https://www.kpit.com/downloads/brochures/oracle/smart-glass-warehouse-picking-solution.pdf&sa=U&ved=0ahUKEwi8vsjt-OfbAhWJ44MKHUJID9sQFggEMAA&client=internal-uds-cse&cx=002791226943158673312:jhkvkoeudrk&usg=AOvVaw0CH-U7bNVPZi218YalX3_t; 2015; pp. 1-4.

MHI; "Vision Picking Technology"; http://www.mhi.org/ofs/solutions-guide/vision; Copyright 2017; 3 pages.

Mobipromo Systems; "MobiPromo Advanced WiFi Marketing System"; https://www.youtube.com/watch?v=XLlojWcd2fQ; Published on Oct. 30, 2013; 8 pages.

PCT; App. No. PCT/US2018/024516; International Search Report and Written Opinion dated Mar. 27, 2018.

Picavi Pick by Vision; "The Future is now"; http://web.archive.org/web/20150818051716/http://www.logcom.de/english/; Aug. 18, 2015; 13 pages.

(56) References Cited

OTHER PUBLICATIONS

Picavi—Pick by Vision; "100% Ready to Use!"; http://www.logcom.de/english/mypicavi/; Retrieved on Nov. 3, 2015; 5 pages.
Picavi GmbH; "Picavi: Vision Picking with Smart Glasses"; https://www.youtube.com/watch?v=B6zPnVGS0VI; Published on Mar. 5, 2015; pp. 1-12.
Reif, Rupert, Gunthner, Willibald A.; "Pick-by-Vision: An Agumented Reality supported Picking System"; WSCG; ISBN 978-80-86943-93-0; 2009; pp. 57-64.
SAPEnterpriseMobile; "SAP & Vuzix Brings you Augmented Reality Solution s for the enterprise"; https://www.youtube.com/watch?v=9Wv9k_ssLcl; Published on May 12, 2013; pp. 1-16.
U.S. Appl. No. 15/939,783; Ex Parte Quayle Action dated Oct. 30, 2018.
U.S. Appl. No. 15/939,783; Notice of Allowance dated Jan. 10, 2019.
Warehouse Logistics; "Arox Logistics IT"; published Jul. 7, 2016; https://www.vuzix.com/Partner/Index/39; 3 pages.

\* cited by examiner

| 102 | Dispose a frame on the head of a user, the frame having a pair of temple arm members configured to rest on ears of the user and a front support having a bridge portion configured to rest on a nose of the user |

↓

| 104 | Receive a task for a work flow for a particular product at a control circuit of an electronic assembly mounted to the frame |

↓

| 106 | Present the task to a user using an output device of the electronic assembly |

↓

| 108 | Receive an operation from a hands-free user input of the electronic assembly mounted to the frame indicating that the task is complete |

↓

| 110 | Send a signal with the control circuit using a transceiver of the electronic assembly to indicate that the task in the work flow is complete |

↓

(A) (B) (C) (D) (E)

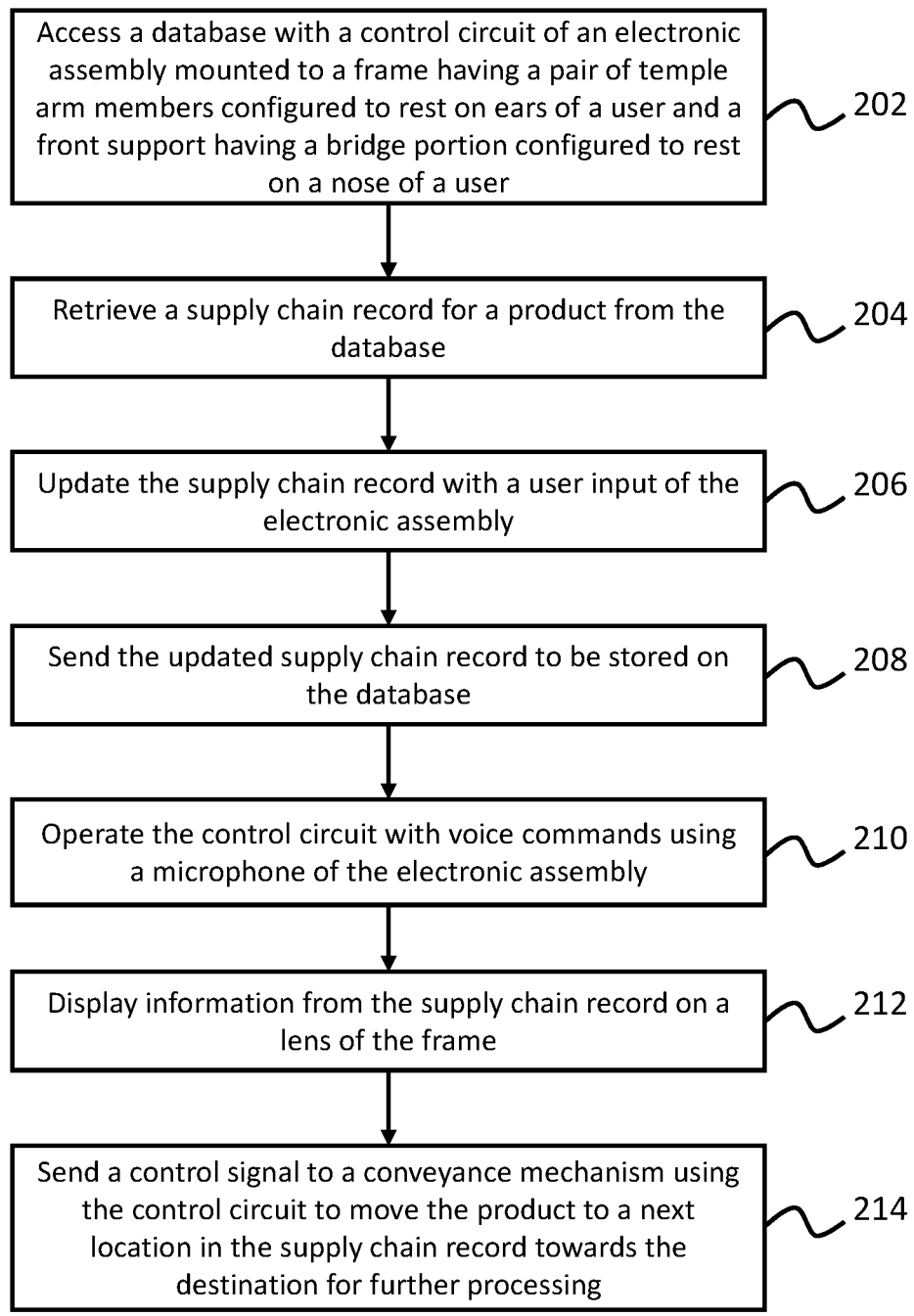

RETAIL INVENTORY SUPPLY CHAIN MANAGEMENT

CROSS-REFERENCE TO RELATED APPLICATION

This application is a continuation of U.S. application Ser. No. 15/939,783, filed Mar. 29, 2018, which claims the benefit of U.S. Provisional Application No. 62/478,093 and U.S. Provisional Application No. 62/478,098 filed Mar. 29, 2017, all of which are incorporated herein by reference in their entirety.

TECHNICAL FIELD

This invention relates generally to supply chain management and, more specifically, to utilizing smart accessories for supply chain management.

BACKGROUND

A supply chain for a product can be a useful tool for companies to determine where a product has been, who has handled the product, and where the product is going. It can be difficult to maintain an accurate and complete supply chain, however, if workers have to manually retrieve and enter information to the supply chain. Additionally, utilizing a workstation or handheld tablet can slow the efficiency of a worker by requiring a worker to carry less or put packages down to enter or retrieve information.

BRIEF DESCRIPTION OF THE DRAWINGS

Disclosed herein are embodiments of systems, apparatuses and methods pertaining to supply chain management. This description includes drawings, wherein:

FIG. 5 is a flowchart in accordance with some embodiments.

FIG. 11 is a flowchart in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to accessing and advancing a work flow for a product. More specifically, a wearable smart device can be utilized by users to access a work flow for a particular product, which can include identification, source, and destination information. The information can be used to confirm that the particular product matches the intended product. The information can also be used to identify a next step for the user in the work flow. Advantageously, the wearable smart device can include a hands-free user input so that the user can send a signal to advance the work flow upon completion of a task.

The wearable smart device can further passively observe operations by the user to collect data regarding the products. The collected data can be used to maintain and count inventory levels, create tasks to reorder products with low inventory, provide information regarding steps in the work flow to identify an error source, and so forth.

By another approach, the wearable smart device can be utilized to monitor and update an inventory supply chain record for one or more products that are within a retail facility and/or between retail facilities, such as but not limited to retail stores where customers enter and purchase products, distribution centers, fulfillment centers, and/or other such retail facilities. A supply chain for a product can include shipping information, delivery vehicle information, package information, package condition, source information, destination information, storage information, and so forth. Each piece of information supplies a portion of the supply chain and can be helpful in tracking the product, as well as determining next steps, finding errors, and providing evidence.

Figure 1:
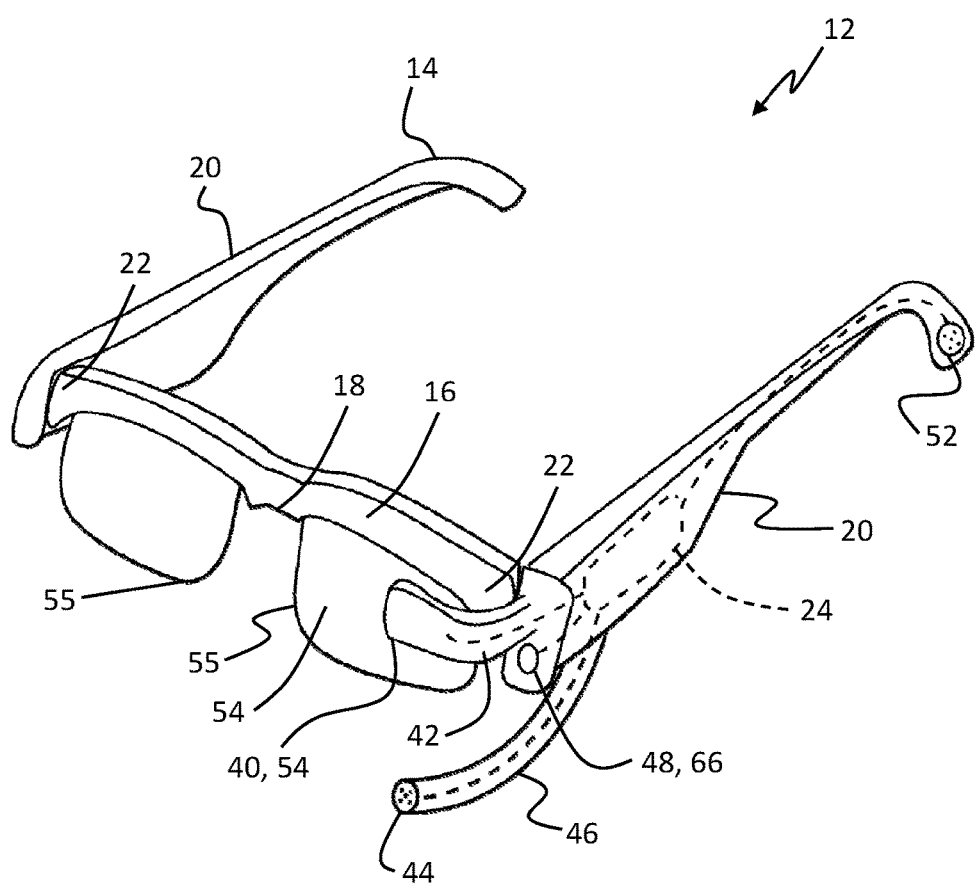
FIG. 1 is a perspective view of smart glasses having an electronic assembly mounted thereto in accordance with some embodiments.

To achieve these aims, an inventory work flow management system 10 and inventory supply chain record system are shown in FIGS. 1-11. The work flow management system 10 includes one or more wearable smart devices 12 in the form of glasses 14. In some embodiments, the wearable smart devices 12 are additionally or alternatively part of the inventory supply chain record system that is configured at least in part to task retail workers at one or more retail facilities with supply chain tasks. As shown in FIG. 1, the glasses 14 include a front frame 16 including a bridge 18 configured to rest on the nose of a user and temple members 20 extending rearwardly from lateral end portions 22 of the front frame 16. If desired, the temple members 20 can be pivotably mounted to the front frame 16, such as by a hinge or the like, so that the glasses 14 can be collapsible to a storage configuration.

Figure 2:
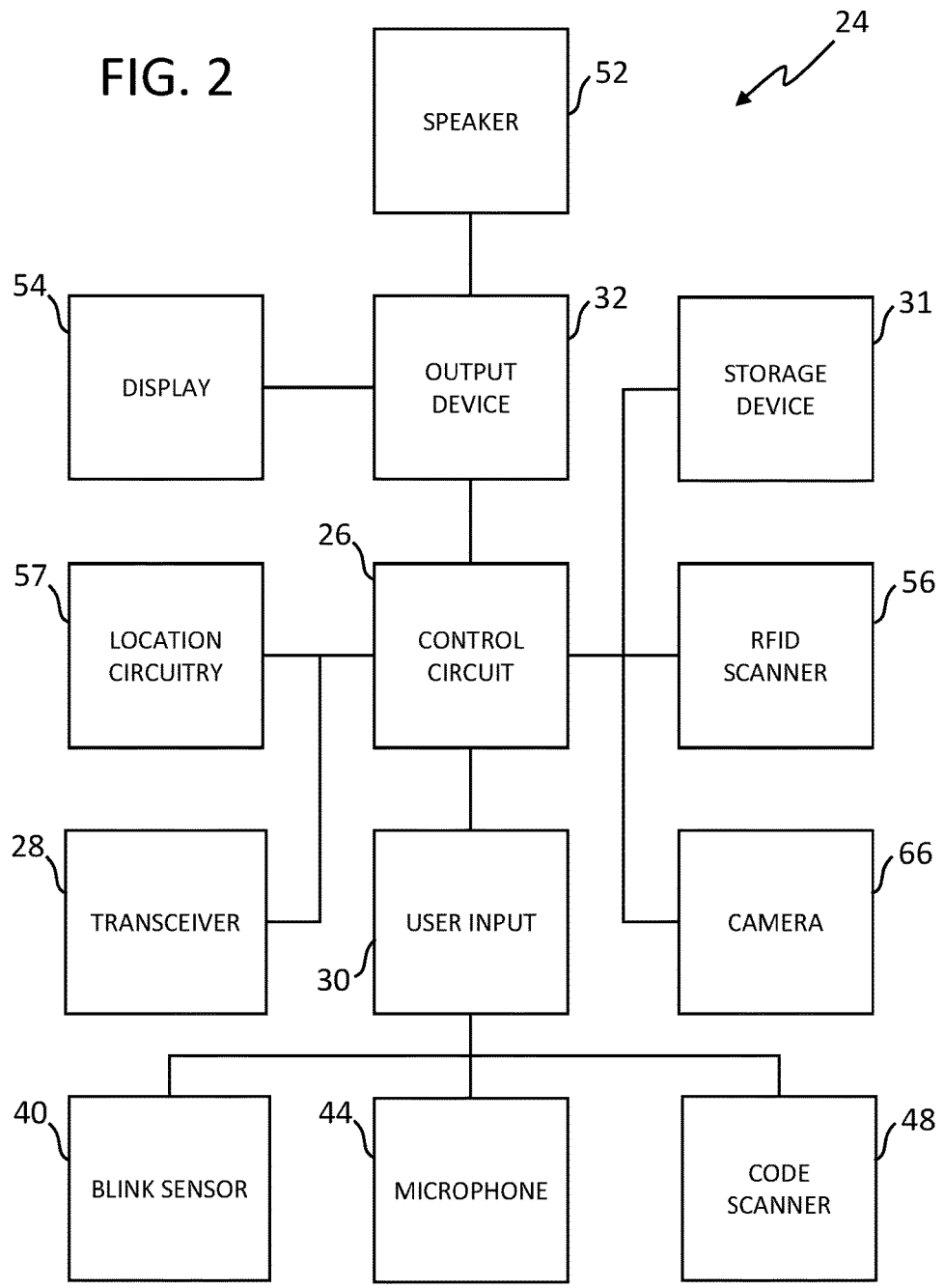
FIG. 2 is a diagrammatic view of an electronic assembly in accordance with several embodiments.

The glasses 14 further include an electronic assembly 24 mounted thereto. As shown in FIG. 2, the electronic assembly 24 can include a control circuit 26; a transceiver 28, a hands-free user input 30 configured to allow a user to send various signals, a local storage device 31, and an output device 32 configured to present information to the user. So configured, the glasses 14 can be utilized by a user to aid in work flow management, as described below.

The glasses 14 can be operated by the user to communicate with a central control circuit 34 to receive or retrieve a work flow for a particular product 36 from a database device 38. The work flow can include identification information, source information, destination information, condition, one or more next tasks to be performed, completed tasks, and other product information. This information can be used by a user to inspect the product to determine whether the work flow information is correct. The user can then access the next task to be performed to efficiently advance the work flow.

The term control circuit refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 26, 34 may be configured (for example, by using corresponding programming stored in a memory as will be well understood by those skilled in the art) to carry out one or more of the steps, actions, and/or functions described herein.

As discussed above, the glasses 14 can include the hands-free user input 30. The user input 30 can take a variety of suitable forms as shown in FIG. 1 and is configured so that a user can send signals or data to the system 10 without having to put down objects or stop working to manipulate a button or other switch.

In a first example, the user input 30 can be a blink sensor 40. The blink sensor 40 is configured to identify a blink of the user to be actuated thereby. If desired, the blink sensor 40 can be configured to compare the blink of the user to a stored blink, such as storage in the local storage device 31 or the database device 38, in order to authenticate the user for commands requiring authorization. The blink sensor 40 can be mounted to an extension portion 42 of the glasses 14 that extends to be disposed forward of an eye of the user. The extension portion 42 can extend from the front frame 16 or one of the temple members 20, as desired.

In a second example, the user input 30 can be a microphone 44 configured to receive voice commands from the user. The microphone 44 can be mounted directly to the front frame 16 or one of the temple members 20, or can be mounted to an extension portion 46 extending from the front frame 16 or temple member 20 to a position closer to the user's mouth. The control circuit 26 can be configured to recognize a variety of verbal commands, as set forth in more detail below.

Figure 3:
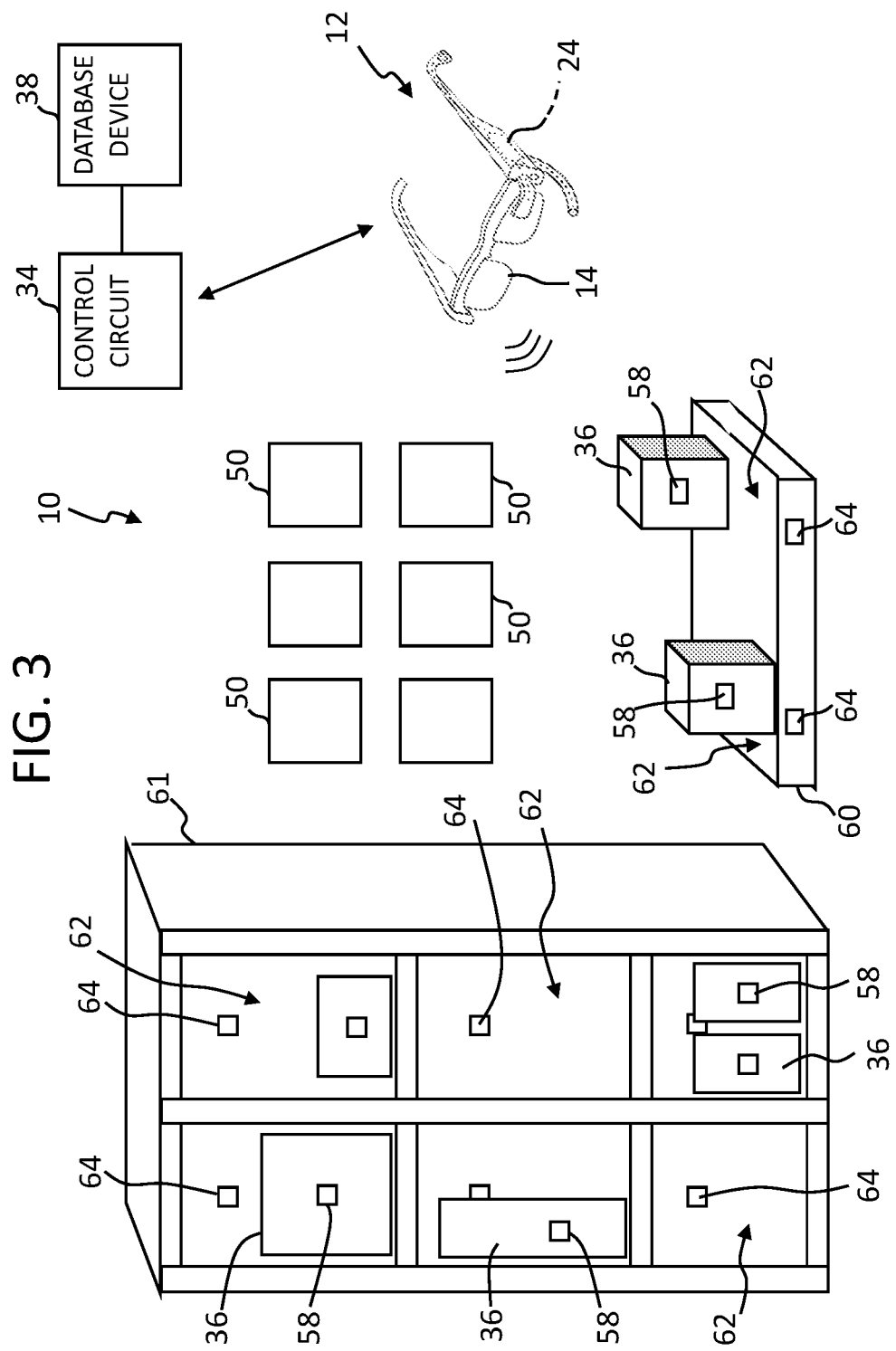
FIG. 3 is a perspective view of storage locations for packages with associated RFID tags within a retail facility in accordance with some embodiments.

In a third example, the user input 30 can be a scanner 48 configured to read machine-readable codes 50, as shown in FIG. 3. The scanner 48 can be mounted to the glasses 14 and oriented to scan codes 50 disposed generally forwardly of the user. So configured, a user can just look at a code 50 for a predetermined amount of time, such as 2 to 5 seconds, or the like, the scanner 48 will read the code, and the control circuit 26 will perform an action indicated by the code 50. For example, the action can be to signal the completion of the task, such as a pick, place, packaging, or other task. In other examples, the code 50 can cause a help signal to be sent to a supervisor or the like or can cause an alarm to sound. Advantageously, a plurality of codes 50 can be mounted to the wall in the work place, to shelving, or other conveniently location area that can be easily viewed by the user.

By one approach, the user input 30 can be actuated by the user to indicate that a task in the work flow for the particular product 36 is completed. If desired, the user can also indicate with the user input 30 when a task has been started. Accordingly, the user can utilize the glasses 14 to work more efficiently, without having to stop and update the work flow process using a hand manipulated switch or button.

As set forth above, the electronic assembly 24 includes the output device 32. The output device 32 is configured to relay information to the user, such as task information, work flow information, confirmation, etc. The output device 32 can take a variety of forms, as shown in FIG. 1. In a first form, the output device 32 can be a speaker 52 disposed adjacent to the ear of the user. In a second form, the output device 32 can be a display 54 extending at least partially in front of an eye of the user. The display 54 can be mounted to the front frame 16 or can be mounted to extend from the temple member 20. More specifically, the display 54 can be incorporated with or projected onto traditional lenses 55 mounted to the front frame 16, which can be refractive and/or tinted as desired. Alternatively, the display can be a separate member extending in front of the lenses 55 or instead thereof.

So configured, the user can be presented with the work flow and task information via the output device 32, complete the task and send a completion signal via the user input 30, and receive a confirmation signal via the output device 32. Upon receiving the signal indicating that the task is complete, the system 10 can update the work flow for the product 36. If desired, the system 10 can then cause a next task to be sent and presented to the user via the output device 32. The user can also indicate using the user input 30 acceptance of the task.

By a further approach, the system 10 can include location tracking for the user. In one form, the electronic assembly 24 can include location determination circuitry 57, such as global positioning or the like. In another form, the system 10 can track a user's location by micro-locationing, telemetry, or the like. As such, the system 10 can monitor the position of the user while the work flow is completed. If desired, upon reception of a new task, or while a task is being performed, the system 10 can provide directions to the user, through the output device 32, to a next location. The next location can be a drop-off or pick-up location for the product 36.

By another approach, the system 10 can be configured to send a user work flow for processing a plurality of products 36. For example, a user can receive and complete a task for a first product 36, such as moving the product 36 to a new location; then receive and complete a task for a second product 36, and so forth. As such, a user can sequentially unload a shipment, restock inventory, etc. without having to stop to determine subsequent tasks or confirming task completion.

In another form, the system 10 can feed shipping and product data to the glasses 14 when a shipment is received and the data can be displayed on or emitted from the output device 32. As such, the user can double check the accuracy of the shipment against the data to confirm an accurate count and identity of products 36 in the shipment.

As shown in FIGS. 2 and 3, the electronic assembly 24 can further include an RFID scanner 56 and the products 36 can have associated RFID tags 58 that contain identification information for the products 36, which can include item, shipping, specification data, for example. So configured, the RFID scanner 56 can read the tags 58 of products 36 to identify the products 36 for the user and the system 10. Further the information read from the product RFID tags 58 can be utilized to confirm shipping and work flow information, i.e., confirm that the right products were delivered in the shipment or are in the right location. If desired, the control circuit 26 can be configured to scan for a particular product with the RFID scanner 56 or can scan an entire pallet or shipment.

RFID verification can advantageously be utilized in conjunction with sending the task completion signals as a secondary confirmation. In one example, the control circuit 26 can present a task of processing a new shipment of products 36 disposed on a pallet 60 or the like. The control circuit 26 can cause the product data to be presented to the user via the output device 32 and the user can verify the products 36 on the pallet 60 using the data. The RFID scanner 56 can automatically read the RFID tags 58 of the products 36 to verify the data stored on the tags 58.

If desired, one or both of the control circuits 26, 34 can maintain a count of the products 36, such as the products 36 handled by the user or within range of the RFID scanner 56, and can be configured to send a low stock signal in response to determining that the count is at or below a predetermined level.

In a further form, storage locations 62 for the products 36, which can be shelves or portions of shelves, pallets, lockers, and so forth, can include associated RFID tags 64 that can identify the storage locations 62 to the system 10 and the user via the RFID scanner 56. Accordingly, the RFID tags 64 can be used to identify a given storage location 62 in a task for the work flow. The user can use the RFID tag 64 data to determine whether a particular storage location 62 is the correct storage location 62 identified in the work flow, such as for pick-up or placement.

By one approach as shown in FIGS. 1 and 2, the electronic assembly 24 can further include a camera 66 mounted to the glasses 14 and oriented to capture media, such as images and/or video, forwardly thereof. The camera 66 can be manually operated, such as via the user input 30, or could have a dedicated control, if desired. The camera 66 can also be automatically operated by the control circuit 26. In either approach, one or both of the control circuits 26, 34 can be configured to analyze the images/video to count the products 36 handled by the user. The count can then be used to determine an inventory level or count for the products 36. If desired, the control circuits 26, 34 can be configured to send a low stock signal in response to determining that the inventory level or count is at or below a predetermined level.

As set forth above, the system 10 described herein can be utilized to provide the work flow to users through the glasses 14. Advantageously, the system 10 can also track and record actions/tasks performed by the user with associated documentation in the form of RFID readings and captured images/video. As such, if an error is discovered regarding a particular work flow, such as a product missing or placed in the wrong area, the system 10 can be utilized to determine the steps taken by the product to find the error in the work flow.

As set forth above, the glasses 14, and specifically the electronic assembly 24 and control circuit 26 thereof, can additionally or alternatively be part of an inventory supply chain record system. The glasses 114 can be utilized to access via the transceiver 28, maintain, and update a supply chain record for the product 36. The inventory supply chain record can include any or all of SKU information for the product, a description of the product, a destination of the product, dimensions of the products, vendors of the product, a condition of the product, a source of the product, a delivery vehicle used for product, a manifest for the product, and/or a purchase order for the product. Further, the control circuit 26 can be configured to update any of the information for the product 36. Additionally, the supply chain records can be stored on the local storage 31 and/or the database device 38. The database stores multiple different supply chain records that each correspond to one of at least tens of thousands of products being distributed to at least a particular retail facility. In some embodiments, the database maintains different supply chain records for tens of millions of products distributed, being distributed or to be distributed to and/or between multiple different retail facilities (e.g., manufacturers, distribution centers, fulfillment centers, retail stores, etc.). In one form, the supply chain record can be stored on the database device 38, so that multiple users can retrieve or receive the supply chain records therefrom, update the supply chain records, and send the updated supply chain records to the central control circuit 34 to be stored on the database device 38.

Through the electronic assembly 24 users at the retail facilities can access, confirm and modify one or more of the supply chain records. Each supply chain record corresponds to at least one particular product within a retail facility or being shipped between retail facilities. In some instances, a supply chain record corresponds to a group of multiple of products that are to be moved along the same supply route. In other embodiments, each supply chain record corresponds to a single specific product. As such, when a group of products are to be moved along the same supply route multiple different supply chain records can include the same supply route information (e.g., locations, destinations, status, etc.).

In some embodiments, the electronic assembly 24 includes the control circuit 26, the transceiver 28, the hands-free user input 30, and other such systems. The control circuit is configured to receive, from the hands-free user input operated by the user while at a location of the set of locations along the supply route, an indication to retrieve a supply chain record corresponding to a particular product of the tens of thousands or more products tracked by the inventory supply chain record system using the multiple supply chain records corresponding to the different products or sets of products. The supply route defines at least a set of locations, which typically include an initial location and a destination location, to which the particular product is to travel between the initial location to the destination location. The control circuit 26 can retrieve, via the transceiver 28, the first supply chain record and cause at least a portion of the retrieved supply chain record to be presented to the user. A user input can be received, through the electronic assembly operated by the user. For example, the input can be regarding or define a condition of the particular product at the location of the set of locations along the supply route, an indication of an error in the supply chain record, a correction of an error in the supply chain, content and/or information to be added to the supply chain record (e.g., status information, audio content, image content, video content, and/or other such information), a change to the supply chain record (e.g., a change to a specified location along the supply route, a change to a current location of the product, instructions or cautions to be considered at subsequent locations and/or by other workers, and/or other such changes), and other inputs. In some embodiments, the control circuit 26 can update the supply chain record based on the user input, and can communicate the updated supply chain record to be stored on the database. In other implementations and/or conditions, the control circuit may communicate the update received from the worker to the database causing the database to update the supply chain record.

As discussed above, the electronic assembly 24 can include a microphone 44, such that the user can record an audio message regarding the product 36 and update the supply chain record with the audio message. More specifically, the user can record one or more details regarding the product 36, such as identification information, a condition of the product 36, a time of delivery, a time of drop-off, or other shipping information. By a further approach, the control circuit 26 can be configured to operate in response to voice commands, as described above. As such, the user can update information in the supply chain record using a voice command.

Further, in the embodiments where the electronic assembly 24 includes the camera 66, the user can record an image or video regarding the product 36 and update the supply chain record with the image or video. For example, the user can capture an image of the delivery vehicle, the product 36 to show the condition thereof, and so forth.

In some embodiments, as set forth above, the glasses 14 can include the display 54, such as on the lens 55 or separate therefrom. So configured, the user can utilize the display 54 to show the supply chain records, current information, updates, and the like.

The electronic assembly 24 to receive inputs from the works. These inputs can include, in some instances, identification of errors and/or corrections of errors. As such, in some embodiments, the control circuit is configured to receive, through the electronic assembly operated by the user, an input regarding an error in the supply chain record, and to further update the supply chain record to correct the error. In some embodiments, the control circuit can further log or track the correction within the supply chain record and/or cause a log to be generated. Further, the control circuit can cause the updated supply chain record to be communicated and stored on the database.

Figure 4:
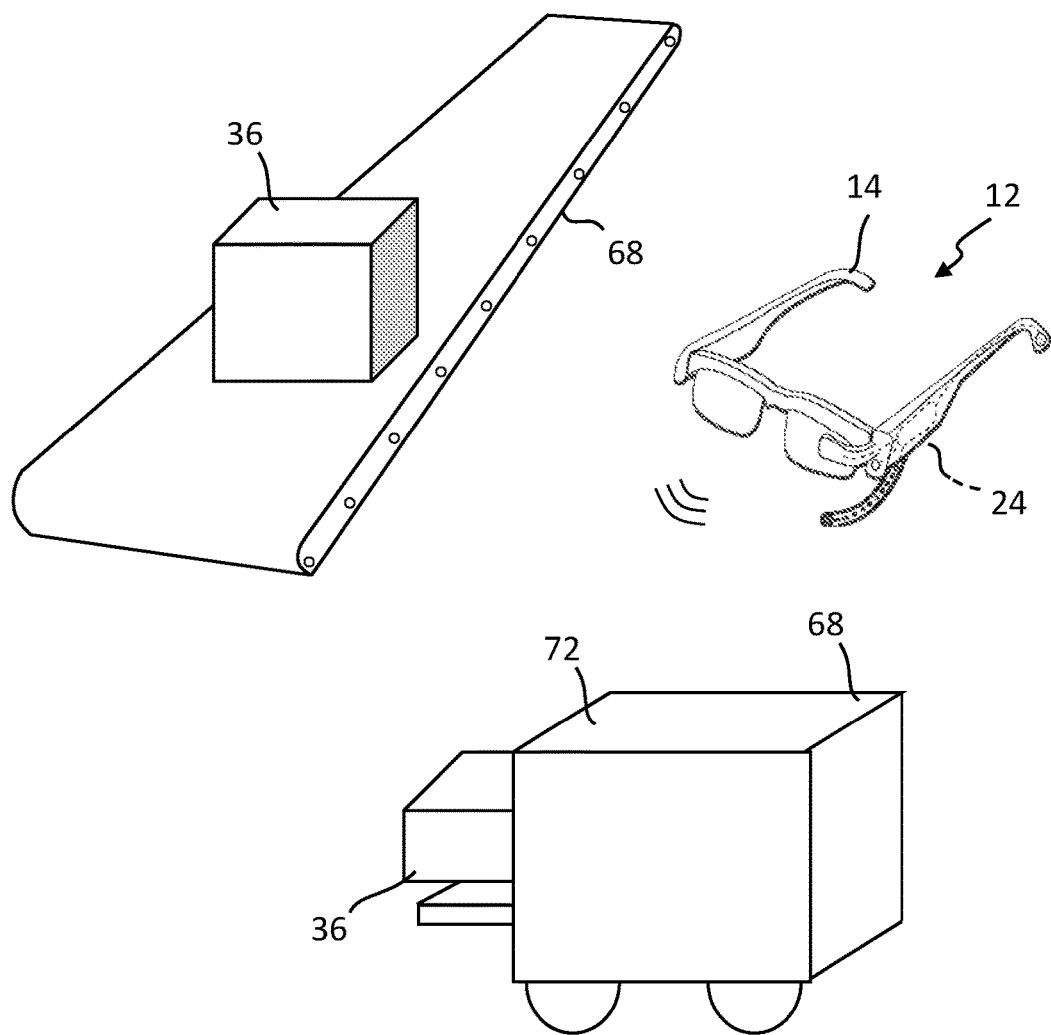
FIG. 4 is a perspective view of smart glasses and conveyance mechanisms in accordance with several embodiments.

By some approaches as shown in FIG. 4, the control circuit 26 can be configured and authorized to send command signals to secondary devices 68, such as any suitable conveyors, any suitable autonomous vehicles or robots 72, and the like. In one example, the supply chain record can include a destination for the product 36 and, if applicable, one or more next or subsequent locations of a set of locations along a supply route for the particular product or products to the final destination location. The supply route defines at least the set of locations, including an initial location and a destination location, to which the product is to travel in reaching the destination location. The locations can include a storage location in a distribution center, a staging area at the distribution area, one or more locations along one or more conveyor system, positioned in a transport vehicle, a storage location in a subsequent fulfillment center, a shipping area of the fulfillment center, a packaging area of a fulfillment center, a delivery staging area of a fulfillment center, a delivery vehicle, a back storage area of a retail store, a pick staging area of a retail store, a shelf on a sales floor of the retail store, a customer's residence, and other such locations through which a product may be routed to reach a final destination location. The supply chain record can be predefined with some or all of the locations along the supply route. In some implementations, however, the supply route may be modified over time with new or revised locations. For example, a preliminary final destination for a particular product may be a fulfillment center until a customer orders that product for delivery at their residence or business. Accordingly, the supply route may be updated with one or more locations between the fulfillment center and the final destination of the customer's delivery location. The supply chain record for that product may further be updated by a worker at any one of the location based on input from the electronic assembly. If the user is tasked with transporting the product 36 to a next location or the destination, the user can instruct the control circuit 26 with the user input 30 to send a command signal to the secondary device 68 via the transceiver 28. The secondary device 68 will then operate and transport the product 36 to a desired location. For example, a conveyor will operate to convey the product 36 therealong or an autonomous vehicle/robot will transport the product 36 to a next programmed location.

In some embodiments, a work flow management apparatus is described herein that includes a frame having a pair of temple arm members configured to rest on ears of a user and a front support having a bridge portion configured to rest on a nose of a user. The head apparatus further includes an electronic assembly mounted to the frame, where the electronic assembly includes a control circuit, a transceiver, an output device, and a hands-free user input. The control circuit is configured to receive a task in a work flow for a particular product via the transceiver and present the task to a user using the output device; and, after completion of the task, the hands-free user input is configured to be operated by a user to send a signal using the transceiver to indicate that the task in the work flow is complete.

By several approaches, the hands-free user input can be a sensor disposed adjacent to an eye of the user when the frame is worn that is configured to detect blinking by the user to send the signal.

By some approaches, the hands-free user input can be a microphone to input voice commands through the microphone to the control circuit to send the signal.

By several approaches, the hands-free user input can be a scanner configured to scan machine-readable codes and the control circuit can be configured to interpret the machine-readable codes scanned by the scanner. By further approaches, the user can orient the scanner on a task complete machine-readable code to send the signal. By further approaches, the user can orient the scanner on a help machine-readable; and the control circuit is configured to generate a help signal in response to interpreting the help machine-readable code.

By some approaches, the electronic assembly can further include a camera; and the control circuit can be configured to maintain a count of inventory handled by the user and send a low stock signal for a particular product in response to determining that inventory for the particular product is below a predetermined number.

By several approaches, the products include RFID tags; the electronic assembly comprises a RFID scanner configured to scan the RFID tags of the products; and the control circuit is configured to send a low stock signal in response to determining that a number of RFID tags counted for a particular product is below a predetermined number. By further approaches, storage locations can include RFID tags and the control circuit can be configured to identify a particular product in a particular storage location based on scans from the RFID scanner; receive or retrieve a work flow for the particular product; and determine whether the particular storage location is a correct storage location identified in the work flow for the particular product.

By some approaches, the frame can include a lens mounted to the front support; and the output device can be a display on the lens.

In several embodiments and as shown in FIGS. 5-10, a method 100 for managing a work flow is described herein that includes disposing 102 a frame on the head of a user, the frame having a pair of temple arm members configured to rest on ears of the user and a front support having a bridge portion configured to rest on a nose of the user; receiving 104 a task for a work flow for a particular product at a control circuit of an electronic assembly mounted to the frame; presenting 106 the task to a user using an output device of the electronic assembly; receiving 108 an operation from a hands-free user input of the electronic assembly mounted to the frame indicating that the task is complete; and sending 110 a signal with the control circuit using a transceiver of the electronic assembly to indicate that the task in the work flow is complete, in response to the operation of the hands-free user input.

By some approaches, receiving 108 the operation of the hands-free user input can include detecting blinking by the user with a sensor disposed adjacent to an eye of the user when the frame is worn. By other approaches, receiving 108 the operation of the hands-free user input can include receiving a voice command to send the signal through a microphone of the electronic assembly and analyzing the voice command with the control circuit. By yet other approaches, receiving 108 operation of the hands-free user input can include scanning a machine-readable code indicating a complete task with a scanner of the electronic assembly, and interpreting the machine-readable code with the control circuit to send the signal.

Figure 6:
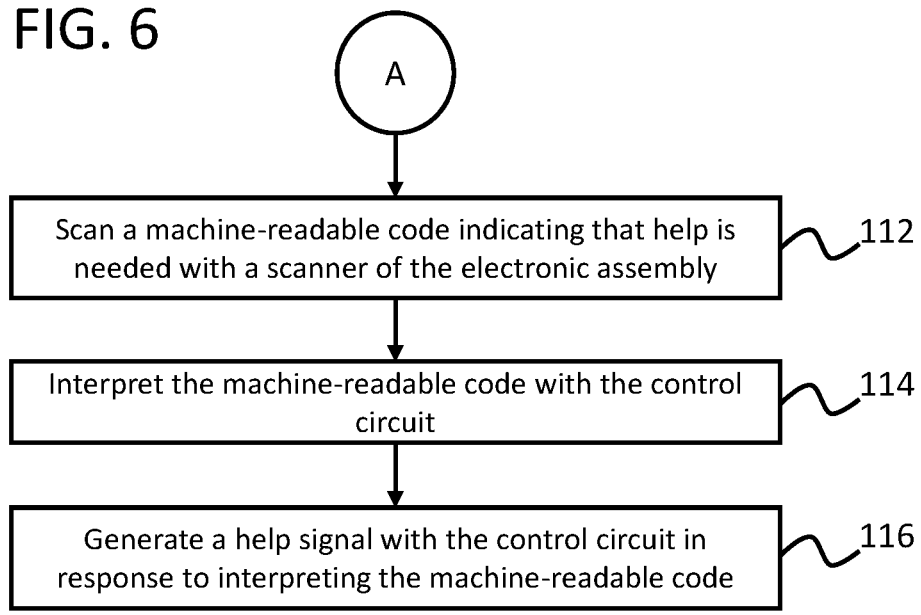
FIG. 6 is a flowchart in accordance with several embodiments.

By several approaches and as shown in FIG. 6, the method 100 can further include scanning 112 a machine-readable code indicating that help is needed with a scanner of the electronic assembly; interpreting 114 the machine-readable code with the control circuit; and generating 116 a help signal with the control circuit in response to interpreting the machine-readable code.

Figure 7:
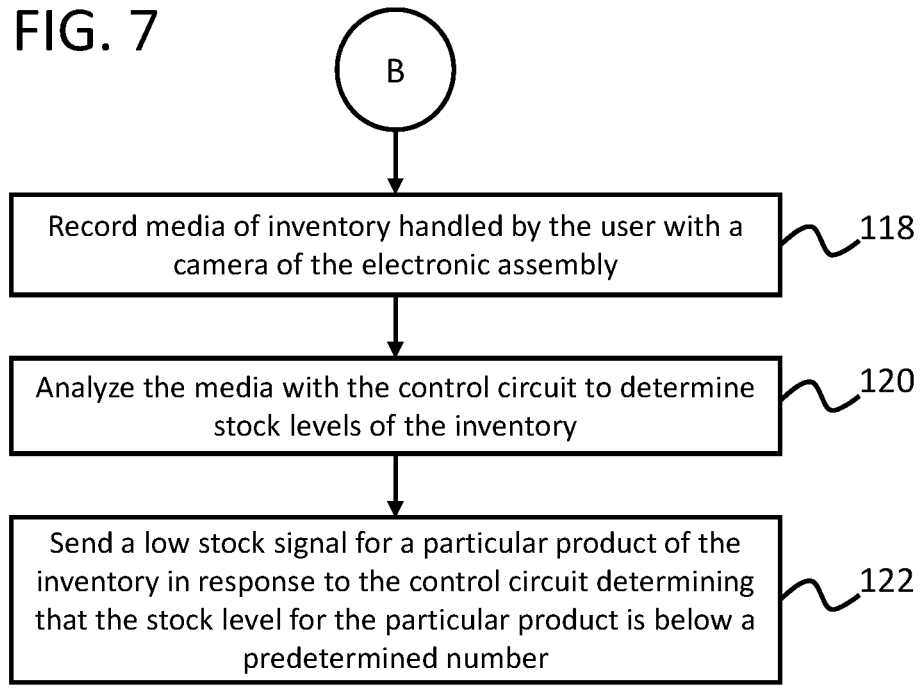
FIG. 7 is a flowchart in accordance with some embodiments.

By some approaches and as shown in FIG. 7, the method 100 can further include recording 118 media of inventory handled by the user with a camera of the electronic assembly; analyzing 120 the media with the control circuit to determine stock levels of the inventory; and sending 122 a low stock signal for a particular product of the inventory in response to the control circuit determining that the stock level for the particular product is below a predetermined number.

Figure 8:
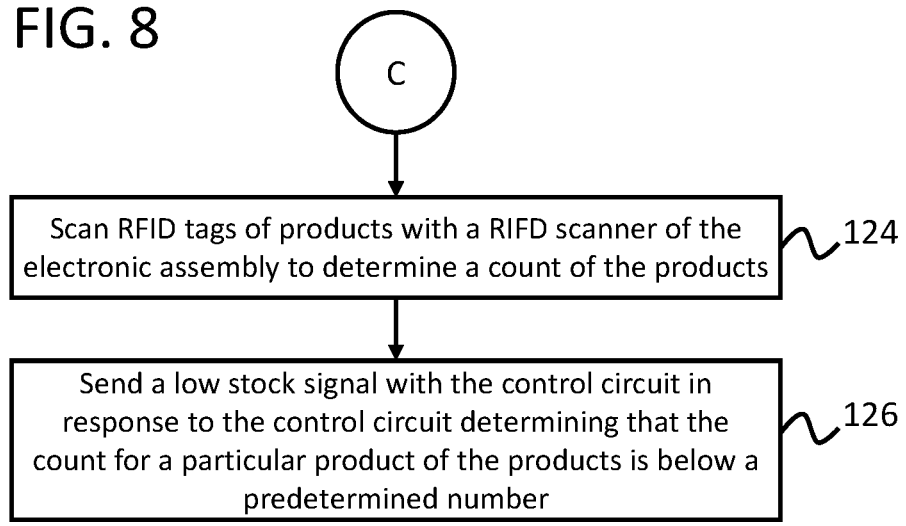
FIG. 8 is a flowchart in accordance with several embodiments.

By several approaches and as shown in FIG. 8, the method 100 can further include scanning 124 RFID tags of products with a RFID scanner of the electronic assembly to determine a count of the products; and sending 126 a low stock signal with the control circuit in response to the control circuit determining that the count for a particular product of the products is below a predetermined number.

Figure 9:
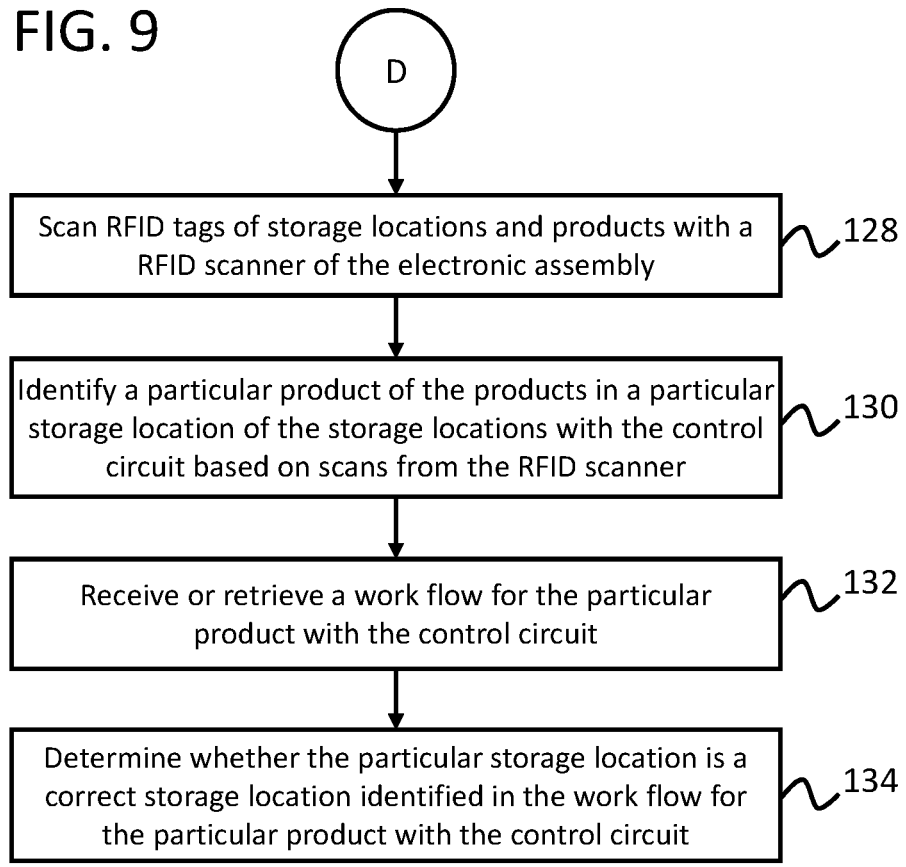
FIG. 9 is a flowchart in accordance with some embodiments.

By some approaches and as shown in FIG. 9, the method 100 can further include scanning 128 RFID tags of storage locations and products with a RFID scanner of the electronic assembly; identifying 130 a particular product of the products in a particular storage location of the storage locations with the control circuit based on scans from the RFID scanner; receiving or retrieving 132 a work flow for the particular product with the control circuit; and determining 134 whether the particular storage location is a correct storage location identified in the work flow for the particular product with the control circuit.

Figure 10:
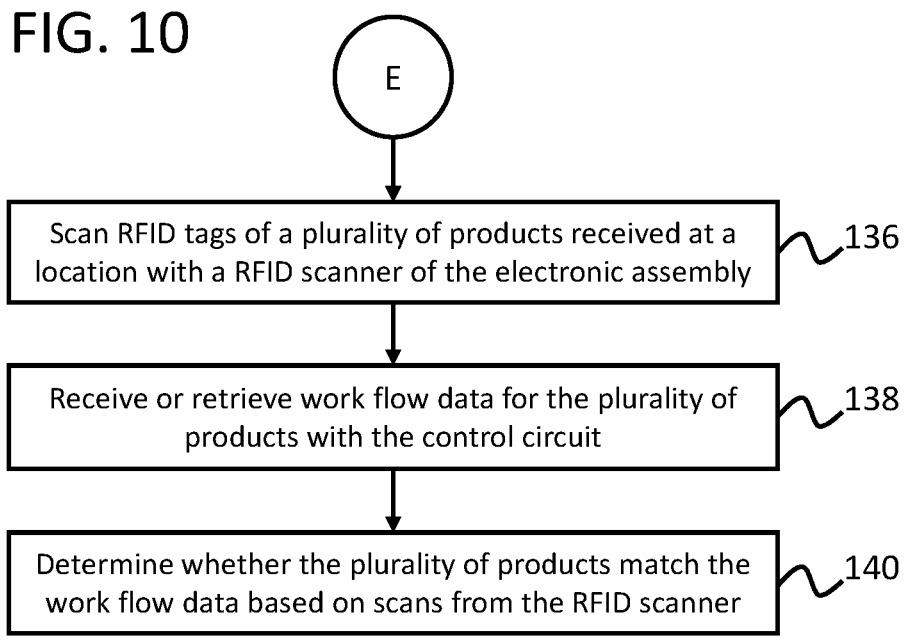
FIG. 10 is a flowchart in accordance with several embodiments.

By several approaches and as shown in FIG. 10, the method 100 can further include scanning 136 RFID tags of a plurality of products received at a location with a RFID scanner of the electronic assembly; receiving or retrieving 138 work flow data for the plurality of products with the control circuit; and 140 determining whether the plurality of products match the work flow data based on scans from the RFID scanner.

Some embodiments provide an inventory supply chain record system configured to task retail workers at a retail facility, provide supply chain record information to the workers and/or receive inputs regarding supply chain records. In some embodiments, the inventory supply chain record system comprises a database having a supply chain record for a product stored thereon; a frame having a pair of temple arm members configured to rest on ears of a user and a front support having a bridge portion configured to rest on a nose of a user; and an electronic assembly mounted to the frame. The electronic assembly includes a control circuit; a transceiver; and a hands-free user input. The user can operate the electronic assembly to retrieve or receive the supply chain record for the product, update the supply chain record, and send the updated supply chain record to the control circuit to be stored on the database.

By several approaches, the electronic assembly can further include a microphone and a memory, such that the user can record an audio message regarding the product and update the supply chain record to include the audio message. The audio message may be associated with one or more time stamps, events, locations or other information corresponding to when the audio message was recorded. By further approaches, the hands-free user input can be voice commands to the control circuit that are captured using the microphone.

By some approaches, the electronic assembly further includes a camera, such that the user can record an image or video regarding the product and update the supply chain record with the image or video. Again, the image and/or video may be correlated within the supply chain record with one or more time stamps, events, locations or other information corresponding to when the image and/or video was recorded.

By several approaches, the frame can include a lens attached thereto so as to be disposed forwardly of a user's eye during use, and the electronic assembly is configured to utilize the lens as a display.

By some approaches, the supply chain record can include a destination location along the supply route for the product, and the control circuit is configured to send a control signal to a conveyance mechanism to move the product to a next location specified in the supply chain record towards the destination for further processing. In some embodiments, the control circuit is configured to receive, through the electronic assembly operated by the user, an input regarding an error in a supply chain recorded. The control circuit can further update the supply chain record to correct the error, and in some instances log the correction. The log of the correction may be incorporated within the supply chain record. Typically, the control circuit causes the further updated supply chain record to be communicated to the database to be stored on the database.

In several embodiments and as shown in FIG. 11, a method 200 for updating a supply chain record is described herein that includes accessing 202 a database with a control circuit of an electronic assembly mounted to a frame having a pair of temple arm members configured to rest on ears of a user and a front support having a bridge portion configured to rest on a nose of a user; retrieving 204 a supply chain record for a product from the database; updating 206 the supply chain record with a user input of the electronic assembly; and sending 208 the updated supply chain record to be stored on the database.

Some embodiments provide a method of updating a supply chain record. The database is accessed with the control circuit 26 of the electronic assembly 24 mounted to a frame 15 having a pair of temple arm members 20 configured to rest on ears of a user and a front support having a bridge portion 18 configured to rest on a nose of a user. An indication to retrieve a supply chain record corresponding to a product of the at least tens of thousands of products is received from a hands-free user input of the electronic assembly being operated by the user at a location of a set of locations along a supply route corresponding to that product, and which is typically specified with the supply chain record. The supply chain record for the product is retrieved from the database. The control circuit can cause at least a portion of the retrieved supply chain record to be presented to the user through the electronic assembly 24. A user input is receiving through the electronic assembly operated by the user regarding a condition of the product at the location of the set of locations along the supply route. The supply chain record can be updated based on the user input provided to the electronic assembly. In some embodiments, the updated supply chain record is communicated to the database to be stored on the database.

By some approaches, the method 200 can further include recording an audio message regarding the product using a microphone of the electronic assembly; and wherein updating 206 the supply chain record comprises updating the supply chain record with the audio message. For example, some embodiments receive, through a microphone of the electronic assembly, an audio message regarding the product using a microphone of the electronic assembly. The audio message regarding the product can be recorded, and the supply chain record can be updated with the audio message.

By several approaches, the method 200 can further receive, through a microphone of the electronic assembly, voice commands. The control circuit can be operated 210 to implement the voice commands detected by the microphone.

By some approaches, the method 200 can further include recording an image or video with a camera of the electronic assembly; and wherein updating 206 the supply chain record comprises updating the supply chain record with the image or video.

By several approaches, the frame can include a lens attached thereto so as to be disposed forwardly of a user's eye during use, and the method 200 can further include displaying 212 information from the supply chain record on the lens. In some embodiments, at least a portion of the supply chain record can be presented to the user by displaying 212 information from the supply chain record on the lens attached to the frame wherein the lens is configured to be disposed forwardly of a user's eye during use.

By some approaches, the supply chain record can include a destination for the product, and the method 200 can further include sending 214 a control signal to a conveyance mechanism using the control circuit to move the product to a next location in the supply chain record towards the destination for further processing. Some embodiments additionally or alternatively communicate, from the electronic assembly controlled by the control circuit, a control signal to a conveyance mechanism that is separate from the electronic assembly causing the conveyance mechanism to move the product to a subsequent location as defined within the supply chain record.

In some embodiments, an inventory work flow management apparatus for tasking retail store workers comprises a frame having a pair of temple arm members configured to rest on ears of a user and a front support having a bridge portion configured to rest on a nose of the user, an electronic assembly mounted to the frame. The electronic assembly comprises a control circuit, a transceiver, an output device, a hands-free user input, and a RFID scanner configured to scan RFID tags on storage locations and products. The control circuit is configured to receive a task in a work flow for a particular product via the transceiver and present the task to the user using the output device, receive, from the hands-free user input operated by the user an indication of a completion of the task, identify the particular product in a particular storage location based on scans from the RFID scanner, determine whether the particular storage location is a correct storage location identified in the work flow for the particular product to confirm the completion of the task, and send a signal using the transceiver to indicate that the task in the work flow is complete.

A method for managing a work flow of retail store workers comprises disposing a frame on a head of a user, the frame having a pair of temple arm members configured to rest on ears of the user and a front support having a bridge portion configured to rest on a nose of the user, receiving a task for a work flow for a particular product at a control circuit of an electronic assembly mounted to the frame, presenting the task to the user using an output device of the electronic assembly, receiving an operation from a hands-free user input of the electronic assembly mounted to the frame indicating a completion of that the task, identifying the particular product in a particular storage location based on scans from a RFID scanner coupled to the frame and configured to scan RFID tags on storage locations and products, determining whether the particular storage location is a correct storage location identified in the work flow for the particular product to confirm the completion of the task; and sending a signal with the control circuit using a transceiver of the electronic assembly to indicate that the task in the work flow is complete, in response to the operation of the hands-free user input.

Some embodiments provide inventory supply chain record systems configured to task retail workers at a retail facility. The inventory supply chain record system, in some implementations, comprises: a database storing supply chain records each corresponding to one of at least tens of thousands of products being distributed to at least a particular retail facility; a frame having a pair of temple arm members configured to rest on ears of a user and a front support having a bridge portion configured to rest on a nose of the user; an electronic assembly mounted to the frame, the electronic assembly comprising: a control circuit; a transceiver; and a hands-free user input; wherein the control circuit is configured to: receive, from the hands-free user input operated by the user at a first location of a set of locations along a supply route, an indication to retrieve a first supply chain record corresponding to a first product of the at least tens of thousands of products, wherein the supply route defines at least the set of locations, including an initial location and a destination location, to which the first product is to travel between the initial location to the destination location; retrieve, via the transceiver, the first supply chain record and cause at least a first portion of the first supply chain record to be presented to the user; receive, through the electronic assembly operated by the user, a user input regarding a condition of the first product at the first location of the set of locations along the supply route; update the first supply chain record based on the user input; and communicate the updated first supply chain record to be stored on the database.

Further, some embodiments provide methods for updating a supply chain record, comprising: accessing a database with a control circuit of an electronic assembly mounted to a frame having a pair of temple arm members configured to rest on ears of a user and a front support having a bridge portion configured to rest on a nose of a user; receiving, from a hands-free user input of the electronic assembly being operated by the user at a first location of a set of locations along a supply route, an indication to retrieve a first supply chain record corresponding to a first product of the at least tens of thousands of products; retrieving a first supply chain record for the first product from the database and causing at least a first portion of the first supply chain record to be presented to the user; receiving, through the electronic assembly operated by the user, a user input regarding a condition of the first product at the first location of the set of locations along the supply route; updating the first supply chain record based on the user input provided to the electronic assembly; and communicating the updated first supply chain record to be stored on the database.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An inventory supply chain record system configured to task retail workers at a retail facility, the system comprising:
   a database storing supply chain records each corresponding to one of at least thousands of products being distributed to at least a particular retail facility;
   a frame having a pair of temple arm members configured to rest on ears of a user and a front support having a bridge portion configured to rest on a nose of the user;
   an electronic assembly mounted to the frame, the electronic assembly comprising:
      a control circuit;
      a transceiver; and
      a hands-free user input;
   wherein the control circuit is configured to:
   receive, through the hands-free user input operated by the user at a first location along a supply route, an indication to retrieve a first supply chain record corresponding to a first product of the at least thousands of products;
   retrieve the first supply chain record and cause at least a first portion of the first supply chain record to be presented to the user;
   receive, through the electronic assembly operated by the user, a user input regarding a condition of the first product at the first location; and
   cause the first supply chain record to be updated at the database based on the user input.

2. The system of claim 1, wherein the electronic assembly comprises a microphone and a memory, such that the user can record an audio message regarding the first product and cause the first supply chain record to be updated with the audio message.

3. The system of claim 1, wherein the electronic assembly comprises a microphone, and the hands-free user input comprises voice commands to the control circuit that are captured using the microphone.

4. The system of claim 1, wherein the electronic assembly comprises a camera, such that the user can record an image or video regarding the first product and cause the first supply chain record to be updated with the image or video.

5. The system of claim 1, wherein the frame includes a lens attached thereto so as to be disposed forwardly of an eye of the user during use, and the electronic assembly is configured to utilize the lens as a display.

6. The system of claim 1, wherein the first supply chain record includes a destination location along the supply route for the first product, and the control circuit is configured to send a control signal to a conveyance mechanism to move the first product to a next location specified in the first supply chain record towards the destination location for further processing.

7. The system of claim 6, wherein the conveyance mechanism comprises one or more conveyors.

8. The system of claim 6, wherein the conveyance mechanism comprises a robot.

9. The system of claim 6, wherein the first supply chain record includes at least one of the following information: SKU information for the first product, a description of the first product, a destination of the first product, dimensions of the first products, vendors of the first product, a condition of the first product, a source of the first product, a delivery vehicle used for first product, a manifest for the first product, or a purchase order for the first product; and the control circuit is configured to cause one or more of the information for the first product to be updated.

10. The system of claim 1, wherein the control circuit is configured to receive, through the electronic assembly operated by the user, an input regarding an error in the first supply chain record, to further cause the first supply chain record to be updated to correct the error and log the correction within the first supply chain record.

11. A method for updating a supply chain record, the method comprising:
   accessing a database with a control circuit of an electronic assembly mounted to a frame having a pair of temple arm members configured to rest on ears of a user and a front support having a bridge portion configured to rest on a nose of the user;
   receiving, through a hands-free user input of the electronic assembly being operated by the user at a first location along a supply route, an indication to retrieve a first supply chain record corresponding to a first product of at least thousands of products;
   retrieving a first supply chain record for the first product from the database and causing at least a first portion of the first supply chain record to be presented to the user;
   receiving, through the electronic assembly operated by the user, a user input regarding a condition of the first product at the first location;
   causing the first supply chain record to be updated based on the user input.

12. The method of claim 11, further comprising:
   receiving, through a microphone of the electronic assembly, an audio message regarding the first product using a microphone of the electronic assembly;
   recording the audio message regarding the first product; and wherein the causing the first supply chain record to be updated comprises causing the first supply chain record to be updated with the audio message.

13. The method of claim 11, further comprising:
receiving, through a microphone of the electronic assembly, voice commands; and
operating the control circuit to implement the voice commands detected by the microphone.

14. The method of claim 11, further comprising recording an image or video captured by a camera of the electronic assembly; and wherein the causing the first supply chain record to be updated comprises causing the first supply chain record to be updated to include the image or video.

15. The method of claim 11, wherein the causing the at least the first portion of the first supply chain record to be presented to the user comprises:
displaying information from the first supply chain record on a lens attached to the frame, wherein the lens is configured to be disposed forwardly of an eye of the user during use.

16. The method of claim 11, further comprising:
communicating, from the electronic assembly controlled by the control circuit, a control signal to a conveyance mechanism that is separate from the electronic assembly causing the conveyance mechanism to move the first product to a subsequent location as defined within the first supply chain record.

17. The method of claim 16, wherein sending the control signal to the conveyance mechanism comprises sending a control signal to one or more conveyors.

18. The method of claim 16, wherein sending the control signal to the conveyance mechanism comprises sending a control signal to a robot.

19. The method of claim 16, wherein the first supply chain record includes at least one of the following information: SKU information for the first product, a description of the first product, a destination of the first product, dimensions of the first products, vendors of the first product, a condition of the first product, a source of the first product, a delivery vehicle used for first product, a manifest for the first product, or a purchase order for the first product; and wherein the causing the first supply chain record to be updated comprises causing one or more of the information for the first product to be updated.

20. The method of claim 11, further comprising:
receiving, through the electronic assembly operated by the user, an input regarding an error in the first supply chain record;
causing the first supply chain record to be further updated to correct the error; and
causing the correction to be logged within the first supply chain record.

* * * * *

UNITED STATES PATENT AND TRADEMARK OFFICE
CERTIFICATE OF CORRECTION

Page 1 of 1

PATENT NO. : 10,423,910 B2
APPLICATION NO. : 16/381371
DATED : September 24, 2019
INVENTOR(S) : Ryan Lee et al.

It is certified that error appears in the above-identified patent and that said Letters Patent is hereby corrected as shown below:

In the Claims

Column 16, Line 10-11, Claim 19, replace "products" after "the first" with --product--.

Signed and Sealed this
Eighteenth Day of February, 2020

Andrei Iancu
*Director of the United States Patent and Trademark Office*